(12) United States Patent
Agee

(10) Patent No.: US 10,434,484 B1
(45) Date of Patent: Oct. 8, 2019

(54) STACKED ZONE VERTICAL TUBULAR REACTOR

(71) Applicant: Emerging Fuels Technology, Inc., Tulsa, OK (US)

(72) Inventor: Kenneth L. Agee, Tulsa, OK (US)

(73) Assignee: Emerging Fuels Technology, Inc., Tulsa, OK (US)

( * ) Notice: Subject to any disclaimer, the term of this patent is extended or adjusted under 35 U.S.C. 154(b) by 0 days.

(21) Appl. No.: 16/369,695

(22) Filed: Mar. 29, 2019

(51) Int. Cl.
| | | |
|---|---|---|
| *B01J 8/06* | (2006.01) | |
| *C10G 2/00* | (2006.01) | |
| *B01J 8/22* | (2006.01) | |
| *B01J 8/00* | (2006.01) | |

(52) U.S. Cl.
CPC .............. *B01J 8/065* (2013.01); *B01J 8/003* (2013.01); *B01J 8/0015* (2013.01); *B01J 8/067* (2013.01); *B01J 8/22* (2013.01); *C10G 2/341* (2013.01); *C10G 2/344* (2013.01); *B01J 2208/00752* (2013.01); *B01J 2208/00761* (2013.01); *B01J 2208/021* (2013.01); *B01J 2208/027* (2013.01); *C01B 2203/062* (2013.01); *C01B 2203/1241* (2013.01); *C10G 2300/1022* (2013.01)

(58) Field of Classification Search
CPC . B01J 8/065; B01J 8/067; B01J 8/0015; B01J 8/003; B01J 19/2425; B01J 2208/027; B01J 2208/06; B01J 2208/065; B01J 2208/00752; B01J 2208/00761; C10G 2/341
See application file for complete search history.

(56) References Cited

U.S. PATENT DOCUMENTS

| | | |
|---|---|---|
| 7,132,555 B2 | 11/2006 | Te Raa et al. |
| 7,608,344 B2 | 10/2009 | Abbott et al. |
| 8,088,344 B2 | 1/2012 | Te Raa et al. |
| 8,354,040 B1 | 1/2013 | Kenar |
| 8,420,023 B2 | 4/2013 | Tatarchuk et al. |
| 8,722,747 B2 | 5/2014 | Gamlin et al. |
| 8,802,903 B2 | 8/2014 | Weiner et al. |
| 8,906,970 B2 | 12/2014 | Gamlin |
| 9,012,358 B2 | 4/2015 | Gamlin et al. |
| 9,890,333 B2 | 2/2018 | Groppi et al. |
| 10,011,776 B2 | 7/2018 | Paturzo et al. |

*Primary Examiner* — Lessanework Seifu
(74) *Attorney, Agent, or Firm* — Head, Johnson, Kachigian & Wilkinson, PC

(57) ABSTRACT

A stacked zone vertical tubular reactor for conducting an exothermic reaction. The reactor may comprise two or more stacked catalyst zones in each reactor tube. Each reactor tube may contain internal feed and discharge tubes, transition zones comprising a catalyst support plate and a zone separator plate, and a heat transfer element located in each catalyst zone.

22 Claims, 3 Drawing Sheets

STACKED ZONE VERTICAL TUBULAR REACTOR

CROSS REFERENCE

Not Applicable.

BACKGROUND OF THE INVENTION

Field of the Invention

This invention relates generally to a catalyst/reactor system for exothermic catalytic reactions, particularly Fischer Tropsch and related reactions.

Description of the Related Art

Exothermic chemical reactions require excellent heat transfer to maintain the reaction within a targeted temperature range, especially in a commercial process unit, such as in chemical plants or petroleum refineries where great amounts of heat need to be transferred. An example of an exothermic chemical reaction is the Fischer Tropsch reaction. While many exothermic reactions may be conducted in the reactor of the present invention, the invention is described as a Fischer Tropsch reactor.

Various processes are known for the conversion of carbonaceous feeds or light hydrocarbon containing gases into normally liquid products such as methanol, higher alcohols, and hydrocarbon fuels and chemicals, particularly paraffinic hydrocarbons. Such processes are directed at the objective of adding value to the feedstock by making a transportable, more valuable product such as diesel fuel or jet fuel or chemicals such as base oils or drilling fluids.

The Fischer Tropsch process can be used to convert such feedstocks into more valuable easily transportable liquid hydrocarbon products and chemicals. The feedstock is first converted to synthesis gas comprising carbon monoxide and hydrogen. The synthesis gas is then converted to heavy hydrocarbon products using a Fischer Tropsch catalyst. The heavy hydrocarbon products can be subjected to further workup by hydroprocessing, such as hydrocracking and/or hydroisomerization and distillation, resulting in, for example, a high yield of high-quality middle distillate products such as jet fuel or diesel fuel. The heavy hydrocarbon products can also be upgraded to specialty products such as solvents, drilling fluids, waxes, or lube base oils, due to the high purity of the Fischer Tropsch products.

Processes that convert light hydrocarbons to heavier hydrocarbon products for example generally have three steps:
1. conversion of a carbonaceous feedstock such as natural gas, coal, petroleum coke, heavy oils, biomass, landfill gas, biogas, and municipal waste into synthesis gas comprising carbon monoxide and hydrogen;
2. conversion of the synthesis gas to heavy hydrocarbons via the Fischer Tropsch reaction; and
3. hydroprocessing the heavy hydrocarbon product to yield one or more finished hydrocarbon products.

The design of a Fischer Tropsch reactor is of paramount importance for the technical and economic success of a plant comprising the conversion of synthesis gas into hydrocarbons. The reactor may be a fluidized bed, slurry bubble column, or fixed bed reactor. Several different fixed bed reactor designs have been used for the Fischer Tropsch reaction, such as lamella plate, double tube, micro channel, and vertical tubular fixed bed. The reactor of the present invention is a vertical tubular fixed bed reactor.

The reactor needs to meet many conditions and process requirements, such as minimum complexity, ease of construction, reliability, and low risk scalability. Vertical tubular reactors have been demonstrated to be very reliable and easily scalable in commercial plants around the world.

With respect to Fischer Tropsch chemistry, catalyst performance is greatly affected by diffusion limitations within catalyst particles because catalyst pores are filled with heavy hydrocarbon products and hydrogen diffuses faster through the products than carbon monoxide. For discussion purposes herein, a small particle is defined as 0.5 mm diameter and smaller. If the catalyst particle is greater than 0.2 mm diameter, a H2:CO ratio gradient begins to develop inside the particle, which can cause the Fischer Tropsch reaction to produce elevated levels of methane. The inter particle ratio gradient is not too severe up to a particle size of about 0.5 mm in diameter, so catalyst performance is still very good. As the particle size is increased above 0.5 mm, however, the methane selectivity problem grows rapidly. The performance difference in a 0.5 mm diameter particle and a 2.0 mm diameter particle can be on the order of 5% methane selectivity versus 25% or higher methane selectivity. Unfortunately for commercial fixed bed reactors, catalyst particle size of 2.0 mm or more is necessary due to pressure drop across a fixed bed of catalyst. Therefore, a tradeoff has to be made between large particles with suboptimal catalyst performance and an acceptable reactor design, or small particles with optimal catalyst performance and multiple short reactors with high capital cost. In addition to selectivity problems, larger particles (greater than 0.5 mm diameter) also have a lower effectiveness factor and therefore are less active at a given temperature. One can raise the temperature to offset the loss of activity, but increased temperature causes additional increases in methane selectivity.

Moving bed reactors, such as a fluidized bed or slurry bubble column reactor, might be considered. These reactors require a small particle catalyst to operate (typically 0.1 mm to 0.2 mm) and the performance benefit of the small particle is one of the reasons to select these reactors. However, the fluidized bed and slurry bubble column reactors are complicated to design, scale-up, and operate. By comparison, a vertical tubular fixed bed reactor is much easier to scale-up and operate, but a packed bed of small particles has such a high pressure drop that it severely limits the tube geometry, resulting in a short wide reactor that is costly to build. Therefore, it is an objective of the present invention to provide a vertical tubular fixed bed reactor that is economical to construct, scalable, and provides good operating performance with a small particle high performance catalyst.

It is desirable to operate the reactor of the present invention at high throughput and high catalyst productivity. High catalyst productivity can be achieved by using small catalyst particles, but pressure drop becomes prohibitive, as described above. One approach to solve this problem has been to use a large particle catalyst with a non-homogeneous loading of the active metal required for the reaction. This catalyst is called an eggshell or rim catalyst because the active metal is in the outer edge of the catalyst particle. The problem with the eggshell or rim catalyst is that these catalysts are more complicated and expensive to manufacture and it is hard to get enough active metal in the reactor because a substantial portion of each catalyst particle is inert, providing no contribution to activity. Another approach is to load the catalyst into voids in a metal sponge matrix. Open voids in the sponge allow gases to pass through the reactor while avoiding the very high pressure drop that would result if the reactor were completely filled with small catalyst particles. Again, a substantial portion of the reactor does not have active metals and it is difficult to get uniform loading of the catalyst. Yet another approach is to load the tubes with catalyst filled inserts or cans that cause the tubes to be a series of stacked radial flow reactors. Gas is passed through a small opening in the first can and then flows radially through the catalyst bed. The gas collects in an annular space near the reactor tube wall where it is directed up and then down against the tube wall at high velocity to improve heat removal, and then to the top of the next can. Many cans are stacked into each tube and consequently the reactor output, which is two phase flow comprising unreacted gases and products, flows radially out, then up and then down many times. This design is complex and may prove to be difficult to operate if catalyst settling causes the feed gas to bypass the catalyst bed, or liquid filled flow passages cause slugging, resulting in unequal flow in various tubes.

It is further desirable for the reactor of the present invention to utilize long, large diameter tubes. From a construction standpoint, it is more cost effective to build the reactor with long, large diameter tubes. The tube sheets are expensive and complicated to build, so if the tubes are long you get more catalyst volume with the same tube sheets. Larger diameter tubes require less labor to install and weigh less for the same catalyst volume.

The improvement of the present invention is to provide a vertical tubular reactor with stacked catalyst beds within each tube. The stacked beds make it possible to take advantage of the best properties of a vertical tubular reactor (reliability and scalability) in a very economical configuration (long, large diameter tubes) while using a highly active small particle catalyst with acceptable pressure drop.

SUMMARY OF THE INVENTION

In general, in a first aspect, the invention relates to a reactor comprising: a top tube sheet; a top head located above the top tube sheet; a bottom tube sheet; a bottom head located below the bottom tube sheet; one or more reactor tubes, where each reactor tube is fixed to the top tube sheet and to the bottom tube sheet; a top catalyst zone in each reactor tube, where the top catalyst zone is in fluid communication with the top head such that the top catalyst zone is capable of receiving feed gas from the top head; a bottom catalyst zone in each reactor tube, where the bottom catalyst zone is located below the top catalyst zone and where the bottom catalyst zone is in fluid communication with the bottom head such that the bottom head is capable of receiving reactor discharge from the bottom catalyst zone; a transition zone in each reactor tube, where the transition zone is located between the top catalyst zone and the bottom catalyst zone, the transition zone comprising a catalyst support plate and a zone separator plate; an internal feed tube passing through the top catalyst zone and the transition zone and fluidly connecting the top head to the bottom catalyst zone such that the bottom catalyst zone is capable of receiving feed gas from the top head via the internal feed tube; and an internal discharge tube passing through the transition zone and the bottom catalyst zone and fluidly connecting the top catalyst zone to the bottom head such that the bottom head is capable of receiving reactor discharge from the top catalyst zone.

The reactor may further comprise: at least one intermediate catalyst zone located between the top catalyst zone and the bottom catalyst zone; at least one additional transition zone such that one transition zone is located between the top catalyst zone and the at least one intermediate catalyst zone, one transition zone is located between each intermediate catalyst zones if more than one intermediate catalyst zone is present, and one transition zone is located between the at least one intermediate catalyst zone and the bottom catalyst zone, each additional transition zone comprising a catalyst support plate and a zone separator plate; at least one additional internal feed tube, where each additional internal feed tube fluidly connects the top head to one of the at least one intermediate catalyst zone such that the intermediate catalyst zone is capable of receiving feed gas from the top head via the additional internal feed tube; and at least one additional internal discharge tube, where each additional internal discharge tube fluidly connects one of the at least one intermediate catalyst zone to the bottom head such that the bottom head is capable of receiving reactor discharge from the intermediate catalyst zone. The internal feed tube may be capable of being used to load catalyst into the bottom catalyst zone. The catalyst support plate may be set at an angle and may comprise a drain hole capable of discharging catalyst, while the reactor may further comprise a rod inserted into the internal discharge tube supporting a plug in the drain hole such that the plug is capable of holding catalyst in the top catalyst zone in place while allowing for discharge of reactor discharge during normal operation and removal of the catalyst when needed.

The reactor may be a Fischer Tropsch reactor.

Figure 1:
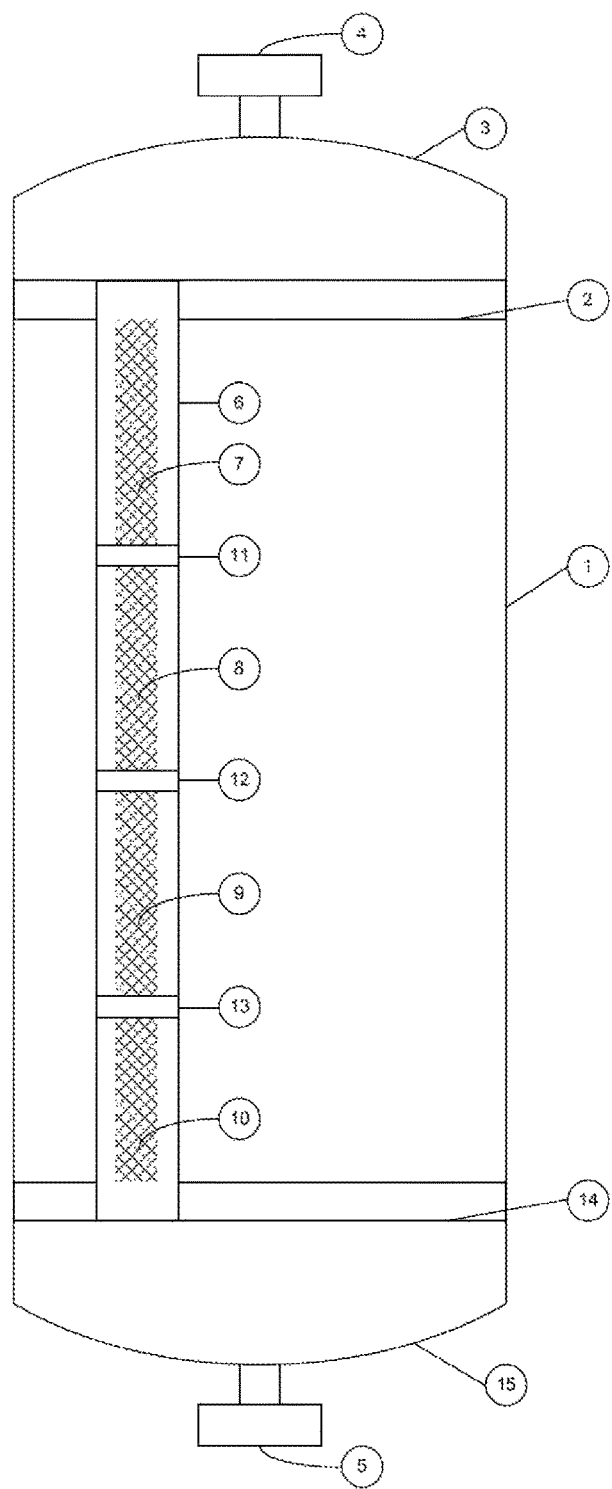
FIG. 1 shows an embodiment of the present invention with a vertical tubular reactor comprising stacked catalyst zones.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a stacked zone vertical tubular fixed bed reactor and a process for conducting an exothermic reaction therein. The reactor may contain multiple tubes attached to common tube sheets at top and bottom, each tube containing two or more stacked catalyst beds. The exothermic reaction may be a Fischer Tropsch reaction.

The vertical tubular reactor of the present invention may have a plurality of tubes with tube sheets at top and bottom, which fix the tubes and allow for feed gas added to the top head to pass downward through the tubes, which are packed with catalyst, and allow for tail gas (un-reacted hydrogen and carbon monoxide and light hydrocarbon products and water) and heavy hydrocarbon products leaving the tubes, to collect in the bottom head and be removed. The shell around the tubes may be filled with a heat transfer fluid (typically boiling water) which may be circulated (forced or thermosiphon) to remove the heat of reaction.

The reactor tubes may be divided into multiple stacked catalyst zones within each reactor tube. The stacked catalyst zones may be separated by a transition zone comprising a catalyst support plate that seals to the tube wall and holds a catalyst bed and a zone separator plate which also seals to the reactor tube wall and separates one catalyst zone from the next catalyst zone below it. Small tubes internal to the reactor tube may allow passage of feed gas from the top head to the inlet of each of the catalyst zones within the reactor tube, except the first or top zone which may be open to the top head. These tubes are referred to herein as internal feed tubes. Small tubes internal to the reactor tube may also remove or discharge the tail gas and products from each stacked catalyst zone, except the bottom catalyst zone which may be open to the bottom head. These tubes are referred to herein as internal discharge tubes. Both internal feed tubes and internal discharge tubes may be open at the tube sheet but not attached to the tube sheet.

The reactor may have any number of reactor tubes. Each reactor tube may be connected to an upper tube sheet and a bottom tube sheet. In a conventional vertical tubular reactor, all the gas that enters the top head passes through a single catalyst bed in each of the reactor tubes and then products and tail gas exit the reactor through the bottom head. In the present invention, each reactor tube is divided into two, three, four, or more stacked beds, each with a separate feed gas supply from the top head and each with a discharge of products and tail gas that passes directly to the bottom head. Each catalyst zone may contain a heat transfer element inserted into the tube to improve heat removal. The heat transfer element may have multiple legs that contact the tube wall. The heat transfer element may serve to remove heat and may act as a structural member that positions the internal feed and discharge tubes and transfer zones that separate the stacked beds.

As previously described, for ease of construction and economic benefit it is desirable to construct a vertical tubular reactor with long tubes of large diameter. The term long tubes as used herein is defined as tubes longer than 10 feet, preferably longer than 20 feet, although tubes of any length may be used in the reactor of the present invention if desired. The term large diameter tube as used herein is defined as greater than 1 inch, preferably greater than 2 inches outside diameter, although tubes of any diameter may be used in the reactor of the present invention if desired.

The internal structure comprising internal tubes, heat transfer elements, and transition zones may be inserted into the tube before the catalyst is loaded or as the catalyst is loaded. The tube internal structural members may be inserted in sections. The internal feed and discharge tubes that carry feed gas in and products and tail gas out of the stacked zones may be much smaller than the reactor tube, as flow in the empty internal tubes may be 25 to 50 ft/s or more, whereas flow in the catalyst zone may be on the order to 1 ft/s or less to have an acceptable pressure drop.

Reactor tubes are defined as the tubes attached to the upper and lower tube sheets. Internal tubes may be inserted into the reactor tubes along with heat transfer elements and the transition zone plates, comprising a catalyst support plate and a zone separator plate. The catalyst support plate may hold a support grid with holes, screen, wedge wire, sintered metal, combinations thereof, or any material known to one skilled in the art that keeps the small particle catalyst in the zone and allows the tail gas and products to exit the zone. The zone separator plate may seal to the reactor tube wall to separate one zone from the next zone. Internal tubes may pass through the catalyst support plate and the zone separator plate to the inlet and outlet of other zones as needed.

The internal feed tubes may transport feed gas from the top head to each catalyst zone, except the top zone which may be directly open to the top head and therefore may not require a feed tube. The internal discharge tubes may transport tail gas and products from each catalyst zone, except the bottom zone which may be directly open to the bottom head and therefore may not require a discharge tube. The separate stacked catalyst zones may be equally loaded so that the pressure drop in each is the same. This may cause the flow to naturally divide equally into each zone. The catalyst zones may be packed un-equally if it is desired to force more of the flow into one or more of the stacked zones relative to other zones; or, if internal feed tubes are small enough to cause measurable pressure drop in the feed tube, un-equal packing may be used to balance flows in the stacked zones. Optionally, internal discharge tubes may contain a rod with a support plate plug near the internal tube inside diameter that can be inserted into the internal discharge tube up to a position in the catalyst support plate, which would have a drain hole in it. This would hold the catalyst bed in place during normal operation. In this configuration, the catalyst support plate may optionally be set at an angle so that catalyst can be drained out of the catalyst zone through the internal discharge tube without removing the internal heat transfer elements and transition zone plates.

By stacking the catalyst into several zones, the flow required to achieve a conversion target may be split into two, three, four, or more parts, greatly reducing the superficial velocity and therefore pressure drop. The bed depth may also be reduced by a factor of two, three, four, or more, also greatly reducing pressure drop. The net result is that a large volume of gas can be processed with a small particle catalyst in a vertical tubular fixed bed reactor. For example, assume that to achieve a target conversion in a tubular reactor with 40 ft. long tubes, the inlet gas velocity required is 2.1 ft/s and the inlet pressure is 300 psig. For a small particle catalyst that will produce excellent catalytic performance, the pressure drop at this flow is over 30 psi per foot and so it is impossible to use the small particle catalyst in single stage 40 ft. long tubes. The same catalyst however, divided into four stacked zones, has a gas velocity of 0.66 ft./s to each zone (allowing for internal tubes and heat transfer elements), in the same 40 ft. long tube and has a pressure drop of about 4 psi per foot. With a 10 ft. long bed, the total pressure drop is less than 40 psi for each separate catalyst zone, wherein each reactor tube has four separate parallel zones, so the total reactor pressure drop is 40 psi. With this modification according to the present invention, the reactor is cost effective to build and can operate with small particle catalyst prepared with uniform metal distribution, not a rim or eggshell catalyst. In this configuration, a reactor with 1,000 40 foot long tubes performs like a reactor with 4,000 10 foot tubes.

The reactor of the present invention may have tubes that are, for example, 10, 20, 30, or 40 feet long or longer and may comprise two or more stacked catalyst zones. Dividing the reactor tubes into multiple stacked zones gives the designer a good deal of flexibility with respect to catalyst particle size, catalyst performance, and pressure drop. The stacked catalyst zones may be separated by internal structural elements that include a heat transfer element, internal feed and discharge tubes, and transition zones comprising a catalyst support plate and a zone separator plate. The heat transfer element may be made in any shape and of any material known to one skilled in the art. A preferred method is to provide heat transfer elements that are extruded metal such as aluminum, which does not add much weight and has excellent thermal conductivity. A preferred shape comprises a cross section that has spokes that run from the center to the tube wall wherein each spoke has a curve that allows some flex so the insert can be installed and removed more easily. Another preferred shape is a grid of curved members that divide the cross section into approximately equal portions so that the greatest distance from any point in the catalyst bed to a heat transfer surface is about the same, unlike a hub and spoke design where the distance gets to be smaller near the hub. The internal tubes may also be extruded and made integral with the heat transfer elements and serve a dual purpose to carry feed gas into and discharge tail gas and products out of each stacked bed and to provide a structure to support the transition zone elements. Internal tubes may also be separate tubes, they can be located near the center of the reactor tube, near the edge, or anywhere between. They may be round, square, or any shape.

Since the internal tubes are empty (do not contain catalyst), they may be very small relative to the reactor tube. This leaves most of the volume of the reactor tube for catalyst. To maintain good performance and acceptable pressure drop, the velocity in the reactor tube, i.e. through a bed of catalyst, may be as low as 1 ft/s or lower. However, the internal tubes may operate with flows of 25 to 50 ft/s or more. The pressure drop in the internal tube is still very low compared to the pressure drop in the catalyst-packed zone. If the same amount of catalyst is packed in each catalyst zone, the pressure drop and flow may be equal for each stacked catalyst zone.

Internal tubes, heat transfer elements, and catalyst transition zones may be built as a single unit and placed into each reactor tube, or they may be built in sections that attach together as they are inserted into the tubes. The catalyst support plate and zone separator plate may seal against the reactor tube wall. The catalyst support plate may comprise a screen or perforated plate or other element that allows products and un-reacted tail gas to exit each catalyst zone of the reactor. Therefore, a seal at the reactor wall may not be necessary. It may be necessary to seal adequately to retain all of the catalyst particles. The zone separator plate, however, may be more important as this plate separates the outlet of one catalyst zone from the inlet of the next catalyst zone. This plate may have a gasket, ring, or flexible lip seal or other seal as known to one skilled in the art, to seal next to the reactor wall. This seal may need to hold a gas pressure differential equal to the pressure drop across a packed catalyst bed zone. A small leak, while not desirable, may not be a catastrophic failure as it may just allow some by-pass of inlet gas from one zone to the outlet of another zone.

Referring to FIG. 1, a vertical tubular reactor 1 may have a tube sheet 2 at its top and a tube sheet 14 at its bottom. Head 3 at the top and head 15 at the bottom may contain reactant feed and exit products respectively. Reactant gases may enter the reactor at nozzle 4 on the top head 3 and pass through a plurality of tubes. Tube 6 is shown as an example. Tube 6 may contain four stacked beds 7, 8, 9 and 10. Stacked catalyst beds 7, 8, 9, and 10 may be separated by transition zones 11, 12, and 13. Reactant gas in the top head 3 may flow through catalyst zone 7 and in parallel through internal tubes (not shown here), one of which may pass through zone 7 to transition zone 11, one of which may pass thorough zones 7 and 8 and transition zone 11 to transition zone 12, and one of which may pass through zones 7, 8, and 9 and transition zones 11 and 12 to transition zone 13. As such, feed gas may be allowed to flow through each of the stacked beds 7, 8, 9, and 10 in parallel. Reactor discharge comprising tail gas and products, including condensed heavy hydrocarbon products and water, may exit the bottom of tube 6 from the fourth catalyst zone 10 and from internal tubes (not shown here) from zones 7, 8, and 9, pass through head 15, and exit nozzle 5.

Figure 2A:
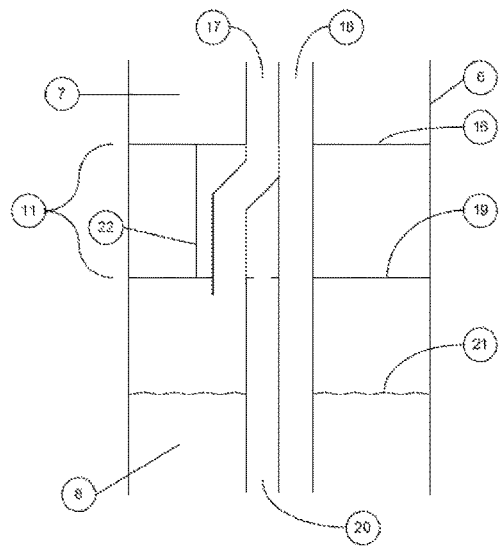
FIG. 2a shows details of the transition zone that separates the stacked catalyst zones.

Referring to FIG. 2a, illustrating one possible configuration of a transition zone, a cross section of reactor tube 6 shows transition zone 11, where a catalyst support plate 16 may be sealed to the wall of reactor tube 6 and may support the catalyst bed 7 above. For discussion purposes this will be described as the top zone or first zone, comprising catalyst bed 7. Internal tubes 17 and 18 of much smaller diameter than the reactor tube 6 may pass through the catalyst bed 7, catalyst support plate 16, and a zone separator plate 19. Internal tube 17 may end just below the zone separator plate 19 and may provide fresh feed gas from the top head 3 to the next catalyst zone or second zone, comprising catalyst bed 8. Internal tube 18 may also pass through catalyst bed 8 to provide fresh feed gas from the top head 3 to a lower catalyst zone, for discussion purposes the third zone, which may comprise catalyst bed 9 of FIG. 1 in this example. If the reactor 1 has four zones, as in FIG. 1, there would be an additional internal tube not visible in the FIG. 2a behind tubes 17 and 18, which may provide fresh feed gas from the top head 3 to the fourth zone, which may comprise catalyst bed 10 of FIG. 1 in this example. Internal tube 20 may be open to the space between the catalyst support plate 16 and the zone separator plate 19. This tube 20 may provide a path for the tail gas and products from the first zone above, comprising catalyst bed 7, to discharge to the bottom head 15 of the reactor 1. The top of the catalyst bed 8 of the second zone is shown as number 21. The transition zone space 11 between the catalyst support plate 16 and zone separator plate 19 may be supported with multiple support legs 22 as needed to provide a fixed separation dimension.

Figure 2B:
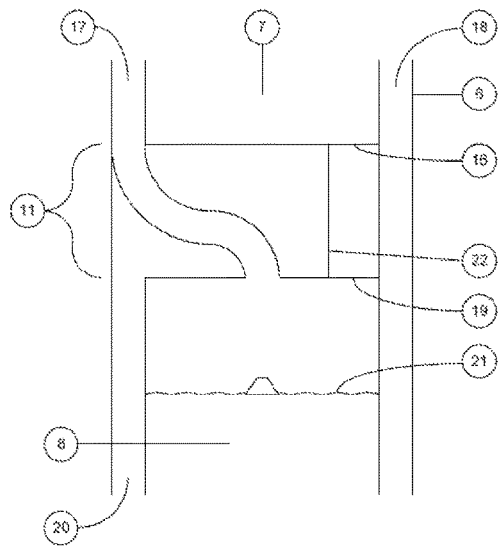
FIG. 2b shows details of another embodiment of the transition zone.

Referring to FIG. 2b, illustrating a different possible configuration of transition zone 11, a cross section of a reactor tube 6 similar to FIG. 2a shows the internal tubes 17 and 18 oriented around the perimeter of the reactor tube 6, as opposed to in the center of reactor tube 6, as shown in FIG. 2a. In both cases, internal tube 17 may passing through the first zone to provide feed gas to the second zone, while internal tube 20 may provide for the removal of tail gas and products from the first zone. By offsetting tube 17 in transition zone 11, the tubes 17 and 18 can stay in the same narrow orientation in the catalyst zones. In this figure where the internal tubes 17 and 18 are oriented at the perimeter of the reactor tube 3, the tube offset is shown so that the feed gas to the next zone is near the center of the zone separator plate 19. This orientation provides two benefits: first, the feed gas distribution may be better, and second, it may be possible to load catalyst to zones lower than the first zone by pouring the catalyst through the corresponding internal feed tube. Internal tube orientation is optional and may be modified for various reasons.

Figure 3A:
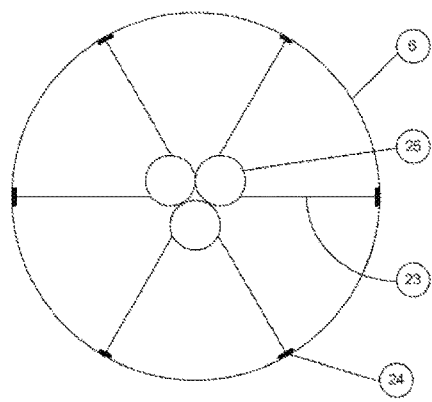
FIG. 3a shows a cross section of the heat transfer element and the internal tubes.

Referring to FIG. 3a, a cross section of a reactor tube in the catalyst zone shows the reactor tube 6 containing heat transfer element 23. In this example, heat transfer element 23 has six legs, each with a foot 24 to contact the wall of reactor tube 6. The legs of the heat transfer element 23 are shown straight in FIG. 3a; however, the legs may have a curved shape so that they are more flexible for installation and removal. At the center of the reactor tube 6 is shown three internal tubes 25. The tube offset described above may only occur in the transition zone, so the tube orientation in the catalyst zone may be the same from the top of the zone to the bottom of the zone. The internal tubes 25 may be for both inlet and outlet tubes. In the first zone of a four zone reactor, as described in the previous figures, all three tubes 25 may be feed tubes. In the second section of the reactor tube 6, two internal tubes 25 may be feed tubes and one internal tube 25 may be an outlet or discharge tube. In the third zone of the reactor tube 6, two internal tubes 25 may be outlet tubes and one may be a feed tube. In the last zone of the reactor tube 6, all three tubes 25 may be outlet tubes.

Figure 3B:
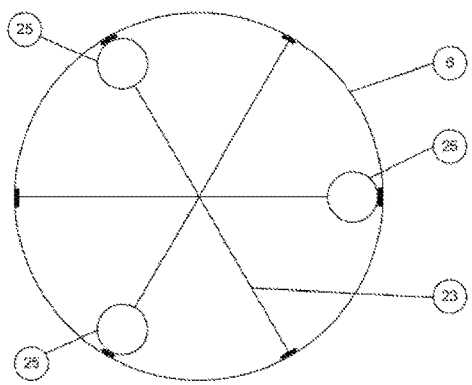
FIG. 3b shows another cross section of the heat transfer element with an alternative configuration for the internal tubes.

Referring to FIG. 3b, another cross section of the reactor tube 6 is shown, with the internal tubes 25 oriented at the perimeter of the reactor tube 6.

Figure 4:
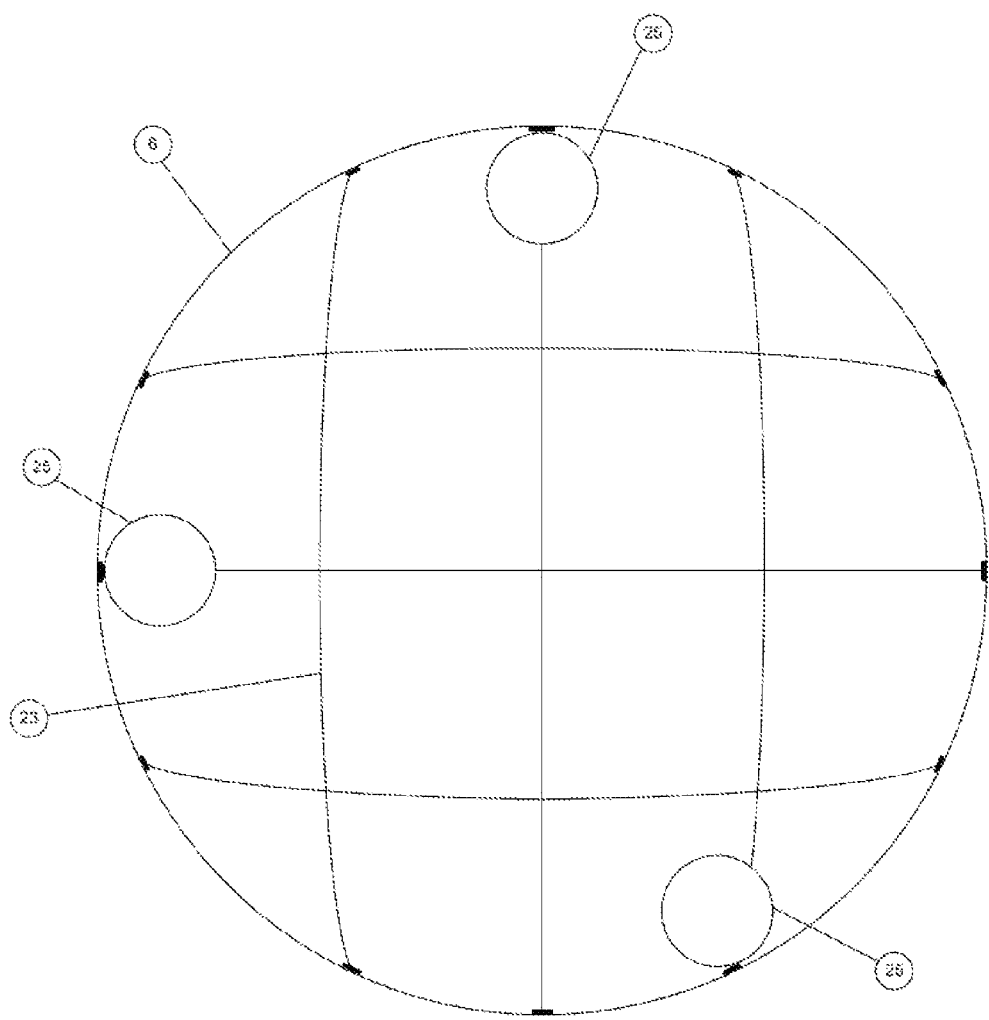
FIG. 4 shows another cross section of an alternative heat transfer element with internal tubes.

Referring to FIG. 4, another cross section of the reactor tube 6 is shown, where the heat transfer element 23 is a grid instead of a hub and spoke configuration.

The embodiments discussed herein are merely illustrative of specific manners in which to make and use the invention and are not to be interpreted as limiting the scope of the instant invention. While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for the purposes of exemplification.

Whereas, the devices and methods have been described in relation to the drawings and claims, it should be understood that other and further modifications, apart from those shown or suggested herein, may be made within the spirit and scope of this invention.

What is claimed is:

1. A reactor comprising:
    a top tube sheet;
    a top head located above the top tube sheet;
    a bottom tube sheet;
    a bottom head located below the bottom tube sheet;
    one or more reactor tubes, where each reactor tube is fixed to the top tube sheet and to the bottom tube sheet;
    a top catalyst zone in each reactor tube, where the top catalyst zone is in fluid communication with the top head such that the top catalyst zone is capable of receiving feed gas from the top head;
    a bottom catalyst zone in each reactor tube, where the bottom catalyst zone is located below the top catalyst zone and where the bottom catalyst zone is in fluid communication with the bottom head such that the bottom head is capable of receiving reactor discharge from the bottom catalyst zone;
    a transition zone in each reactor tube, where the transition zone is located between the top catalyst zone and the bottom catalyst zone, the transition zone comprising a catalyst support plate and a zone separator plate;
    an internal feed tube passing through the top catalyst zone and the transition zone and fluidly connecting the top head to the bottom catalyst zone such that the bottom catalyst zone is capable of receiving feed gas from the top head via the internal feed tube; and
    an internal discharge tube passing through the transition zone and the bottom catalyst zone and fluidly connecting the top catalyst zone to the bottom head such that the bottom head is capable of receiving reactor discharge from the top catalyst zone.

2. The reactor of claim 1 further comprising:
    at least one intermediate catalyst zone located between the top catalyst zone and the bottom catalyst zone;
    at least one additional transition zone such that one transition zone is located between the top catalyst zone and the at least one intermediate catalyst zone, one transition zone is located between each intermediate catalyst zones if more than one intermediate catalyst zone is present, and one transition zone is located between the at least one intermediate catalyst zone and the bottom catalyst zone, each additional transition zone comprising a catalyst support plate and a zone separator plate;
    at least one additional internal feed tube, where each additional internal feed tube fluidly connects the top head to one of the at least one intermediate catalyst zone such that the intermediate catalyst zone is capable of receiving feed gas from the top head via the additional internal feed tube; and
    at least one additional internal discharge tube, where each additional internal discharge tube fluidly connects one of the at least one intermediate catalyst zone to the bottom head such that the bottom head is capable of receiving reactor discharge from the intermediate catalyst zone.

3. The reactor of claim 1 further comprising catalyst particles in the top catalyst zone and the bottom catalyst zone, wherein the catalyst particles are less than 0.5 mm in diameter.

4. The reactor of claim 3 wherein the catalyst particles have a homogeneous distribution of active metals.

5. The reactor of claim 1 further comprising a reactor shell, wherein the shell of the reactor is filled with a heat transfer fluid.

6. The reactor of claim 1 wherein the reactor tubes are each longer than 10 feet.

7. The reactor of claim 1 wherein the reactor tubes each have an outside diameter greater than 1 inch.

8. The reactor of claim 1 wherein the reactor tubes each have an outside diameter greater than 2 inches.

9. The reactor of claim 1 further comprising a first heat transfer element located in the top catalyst zone and a second heat transfer element located in the bottom catalyst zone.

10. The reactor of claim 9 wherein the first heat transfer element and the second heat transfer element each comprise a hub with multiple legs extending to a wall of the reactor tube, each leg having a foot to contact the wall of the reactor tube and each leg having a curved shape.

11. The reactor of claim 9 wherein the first heat transfer element and the second heat transfer element each comprise a grid with no center hub comprising curved legs that contact the wall of the reactor tube.

12. The reactor of claim 9 wherein the first heat transfer element and the second heat transfer element are each extruded and include internal tubes.

13. The reactor of claim 1 wherein the internal feed tube and the internal discharge tube each have a cross section that is round, square, or rectangular.

14. The reactor of claim 1 wherein the catalyst support plate is porous such that catalyst located in the top catalyst zone is held in place but reactor discharge can pass through.

15. The reactor of claim 1 wherein the top catalyst zone and the bottom catalyst zone are packed equally.

16. The reactor of claim 1 wherein the top catalyst zone and the bottom catalyst zone are packed un-equally.

17. The reactor of claim 1 wherein the internal feed tube and the internal discharge tube are configured near a center of the reactor tube.

18. The reactor of claim 1 wherein the internal feed tube and the internal discharge tube are configured near an edge of the reactor tube.

19. The reactor of claim 1 wherein the internal feed tube has an offset in the transition zone, between the catalyst support plate and the zone separator plate.

20. The reactor of claim 1 wherein the internal feed tube is capable of being used to load catalyst into the bottom catalyst zone.

21. The reactor of claim 1 wherein the catalyst support plate is set at an angle and comprises a drain hole capable of discharging catalyst, the reactor further comprising a rod inserted into the internal discharge tube supporting a plug in the drain hole such that the plug is capable of holding catalyst in the top catalyst zone in place while allowing for discharge of reactor discharge during normal operation and removal of the catalyst when needed.

22. The reactor of claim 1 wherein the reactor is a Fischer Tropsch reactor.

* * * * *